(12) United States Patent
Lump et al.

(10) Patent No.: US 6,199,447 B1
(45) Date of Patent: Mar. 13, 2001

(54) BULBOUS GRIP FOR ROTATABLE BICYCLE GEAR SHIFTER

(75) Inventors: Brian L. Lump, Downers Grove; David J. Zimberoff, Chicago; Patrick J. Brady, Chicago; Michael W. Larson, Chicago, all of IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 08/980,113

(22) Filed: Nov. 26, 1997

Related U.S. Application Data

(63) Continuation-in-part of application No. 08/730,352, filed on Oct. 15, 1996, now abandoned, which is a continuation of application No. 08/330,285, filed on Oct. 27, 1994, now Pat. No. 5,564,316, which is a continuation-in-part of application No. 08/287,721, filed on Aug. 9, 1994, now Pat. No. 5,584,213, which is a continuation-in-part of application No. 08/207,249, filed on Mar. 7, 1994, now Pat. No. 5,476,019.

(51) Int. Cl.[7] ............................. B62K 23/04; B62K 21/26
(52) U.S. Cl. ............................................. 74/551.9; 74/489
(58) Field of Search ................................. 74/551.9, 489, 74/488, 551.8, 551.1, 558, 558.5; D8/303, 300, 83; 16/111 R, 110 R, DIG. 12

(56) References Cited

U.S. PATENT DOCUMENTS

| D. 278,879 | 5/1985 | Hwung | D8/303 |
| D. 324,478 | * 3/1992 | Baer | D8/303 |

(List continued on next page.)

FOREIGN PATENT DOCUMENTS

| 2082665 | 5/1993 | (CA) . |
| 667244 | 9/1988 | (CH) . |
| 688541 | 10/1938 | (DE) . |
| 9317875 | 3/1994 | (DE) . |
| 0294720 | 12/1988 | (EP) . |
| 0523257 | 1/1993 | (EP) . |
| 0529664 | 3/1993 | (EP) . |
| 0566024 | 10/1993 | (EP) . |
| 0566025 | 10/1993 | (EP) . |
| 0585473 | 3/1994 | (EP) . |
| 485145 | 12/1917 | (FR) | 74/551.9 |
| 2210973 | 7/1994 | (FR) . |
| 20628 | * of 1892 | (GB) | 74/551.9 |
| 19602 | of 1893 | (GB) . |
| 9278 | of 1893 | (GB) . |
| 27857 | * of 1898 | (GB) | 74/551.9 |
| 122270 | of 1919 | (GB) . |
| 2024381 | 1/1980 | (GB) . |
| 5-32191 | * 2/1993 | (JP) | 74/551.9 |
| 5-32191 | 9/1993 | (JP) . |
| 9219488 | 11/1992 | (WO) . |
| 9402348 | 2/1994 | (WO) . |

OTHER PUBLICATIONS

SRAM Corporation Drawings, Apr. 22, 1992 Representation of handgrip designs that were available to the public more than one year prior to the filing of this application.

*Primary Examiner*—Mary Ann Green
(74) *Attorney, Agent, or Firm*—Piper Marbury Rudnick & Wolfe; Jefferson Perkins

(57) ABSTRACT

A bulbous rotatable gripping surface for a derailleur-type bicycle gear shifting system is formed of a resilient material with axially extending and angularly alternating ridges and base regions. The bulbous shape extending along the handle-bar axis provides an increased diameter that naturally conforms to the longer middle finger of a rider's hand relative to the shorter adjoining index and ring fingers, to aid in the transmission of torque. The ridges and base regions are angularly spaced such that they fit naturally into the crooks of the rider's hand. The ridges, likewise, provide a larger diameter to aid in the transmission of torque and to protrude above any mud which may have collected thereon. To further enhance the torque transmission capabilities of the grip, the gripping surface is provided with a pattern of nubs.

14 Claims, 4 Drawing Sheets

U.S. PATENT DOCUMENTS

| | | | |
|---|---|---|---|
| D. 338,825 | 8/1993 | Brainard | D8/303 |
| D. 361,695 | 8/1995 | Sutker | D7/401.2 |
| D. 406,041 * | 2/1999 | Hsu | D8/303 |
| 886,889 * | 5/1908 | Stokes | 74/551.9 |
| 1,231,055 | 6/1917 | Packard . | |
| 3,020,778 | 2/1962 | Davidson | 74/489 |
| 3,522,745 | 8/1970 | Milosevic | 74/489 |
| 3,713,350 | 1/1973 | Brilando | 74/551.9 |
| 4,137,793 * | 2/1979 | Sowell | 74/551.9 X |
| 4,191,065 | 3/1980 | Golobay et al. | 74/489 |
| 4,201,095 | 5/1980 | Cirami | 74/217 |
| 4,267,744 | 5/1981 | Yamasaki | 74/475 |
| 4,308,762 | 1/1982 | Jannard | 74/551.9 |
| 4,384,864 | 5/1983 | Bonnard | 474/82 |
| 4,526,056 | 7/1985 | Yamanaka | 74/489 |
| 4,548,092 | 10/1985 | Strong, Jr. | 74/475 |
| 4,619,154 | 10/1986 | Yamanaka | 74/489 |
| 4,895,044 | 1/1990 | Ekins | 74/551.9 |
| 4,900,291 | 2/1990 | Patterson | 474/80 |
| 4,938,733 | 7/1990 | Patterson | 474/80 |
| 4,946,425 | 8/1990 | Bühlmann | 474/80 |
| 5,059,158 | 10/1991 | Bellio et al. | 474/70 |
| 5,097,566 * | 3/1992 | Decker et al. | 74/551.9 X |
| 5,102,372 | 4/1992 | Patterson et al. | 474/80 |
| 5,134,897 | 8/1992 | Romano | 74/489 |
| 5,186,071 | 2/1993 | Iwasaki | 74/489 |
| 5,197,927 | 3/1993 | Patterson et al. | 474/80 |
| 5,241,877 | 9/1993 | Chen | 74/489 |
| 5,261,858 | 11/1993 | Browning | 474/69 |
| 5,819,594 * | 10/1998 | Sjovall | 74/551.9 |

* cited by examiner

BULBOUS GRIP FOR ROTATABLE BICYCLE GEAR SHIFTER

CROSS-REFERENCES TO RELATED APPLICATIONS

This application is a continuation-in-part of application Ser. No. 08/730,352 filed Oct. 15, 1996, abandoned, which in turn is a continuation of application Ser. No. 08/330,285 filed Oct. 27, 1994, now U.S. Pat. No. 5,564,316 issued Oct. 15, 1996, which in turn is a continuation-in-part of application Ser. No. 08/287,721 filed Aug. 9, 1994, now U.S. Pat. No. 5,584,213 issued on Dec. 17, 1996, which in turn is a continuation-in-part of application Ser. No. 08/207,249 filed Mar. 7, 1994, now U.S. Pat. No. 5,476,019 issued on Dec. 19, 1995. The above patents and the pending application are fully incorporated by reference herein.

BACKGROUND OF THE INVENTION

1. Field of the Invention

This invention relates to rotatable grips for actuating a derailleur-type bicycle gear shifting system. More particularly, it relates to handlebar-mounted rotatable grips designed to ergonomically fit the joints and lands of a rider's hand.

2. Description of Related Art

Hand-rotatable bicycle gear shifters have been developed as replacements for older lever-actuated shifters, especially for use in conjunction with off-road or "mountain" bicycles. Hand-rotatable shift actuators are disclosed, for example, In U.S. Pat. No. 4,900,291 issued Feb. 13, 1990; U.S. Pat. No. 4,938,733 issued Jul. 3, 1990; U.S. Pat. No. 5,102,372 issued Apr. 7, 1992; and U.S. Pat. No. 5,476,019 issued Dec. 19, 1995. All of these patents are assigned to the assignee of this application. In each of the foregoing patents, a bicycle derailleur is actuated by a rotatable grip which is located on the handlebar of the bicycle inboard of a customary stationary handgrip. Prior to this invention, the gripping surface of rotatable grips sold by the assignee of this application was typically formed of foam rubber or neoprene and had a smooth outer surface, as shown in FIGS. 33 and 40 of U.S. Pat. No. 5,102,372 and FIGS. 21 and 40 of U.S. Pat. No. 5,197,927 reference above.

The assignee has experimented with hand-rotatable grips with axially extending ribs where the grips were formed of a hard plastic material such as ABS; these grips were less than optimal in that they presented harsh sharp edges to the operator's hand. These edges were uncomfortable to the rider, presenting an especially acute problem during jarring off-road bicycle riding over uneven surfaces and obstacles. Also, these prior rotatable grips of the assignee tended to become slippery when fouled by mud and the like, reducing the amount of torque capable of being applied by the rider and requiring the rider to exert a greater gripping force on the shifters. A need therefore exists for improved grips with optimum torque-transmission and anti-fouling features which are adapted to be incorporated into a hand-rotatable gear shifter.

SUMMARY OF THE INVENTION

It is an object of this invention to provide a gripping surface on a handlebar-mounted rotatable grip for actuation of a derailleur-type bicycle gear shift system which more readily and comfortably transmits torque from the rider's hand to the shifter. It is a further object of this invention to provide a gripping surface for a rotatable grip which will allow the rider to effectively transmit torque to the shifter in the presence of mud and debris while providing a comfortable surface for the rider to grip.

According to one aspect of the invention, a grip for a hand-rotatable bicycle gear shifter is provided with an outer gripping surface in the form of a bulb in a direction parallel to the shifter axis with axially extending ridges angularly spaced by elongated base regions about the grip circumference. The ridges are displaced radially outwardly relative to the adjoining base regions. The bulbous shape at the general outer surface of the grip along the shifter axis provides a larger gripping diameter that accommodates the extended length of a rider's middle finger relative to the shorter adjoining index and ring fingers. Both the bulbous shape along the shifter axis and the angularly alternating ridges and base regions define the outer surface of the grip in order to maximize the surface area contacting the rider's hand. The axially extending ridges are of a width and are spaced such that the thumb and at least the index finger and the portion of the palm therebetween readily engage at least 2 or more of the ridges to further enhance torque transmission to the shifter. Additionally, the larger diameter ridges and bulb shape enable the rider to shift with greater mechanical advantage, thereby reducing the torque transmission and gripping or clasping forces that the rider must exert on the shifter.

In a further embodiment of this invention, a rotatable grip is provided with axially extending ribs on the bulbous general outer surface. The axially extending ribs are also of a width and are spaced such that the thumb and at least the index finger and the portion of the palm therebetween readily engage at least 2 or more of the ridges to further enhance torque transmission to the shifter. The ribs are angularly spaced by grooves about the grip circumference, the ribs defining sidewalls formed at a substantial angle to the outer surface of the bulbous grip. A primary function of the ribs is to ensure that a grippable surface protrudes above any mud and debris that may collect on the grip. An additional primary function of the ribs is to improve torque transmission by providing a larger diameter operating surface with more deformable and engageable edges.

In further embodiments of this invention, the ribs, ridges and base regions of the preferred embodiments described herein are provided with radially extending nubs which provide enhanced torque transmission by presenting smaller surface areas which are deflected by engagement with the thumb and at least the index finger and the portion of the palm therebetween. Preferably, a profile of these nubs in an axial section is also bulbous, and the distance between the profile of the general outer surface and that of the nubs is substantially constant.

BRIEF DESCRIPTION OF THE DRAWINGS

Other aspects of the invention and their advantages will be discerned from the following detailed description, in which like characters denote like parts, and in which.

DESCRIPTION OF THE PREFERRED EMBODIMENTS

Figure 1:
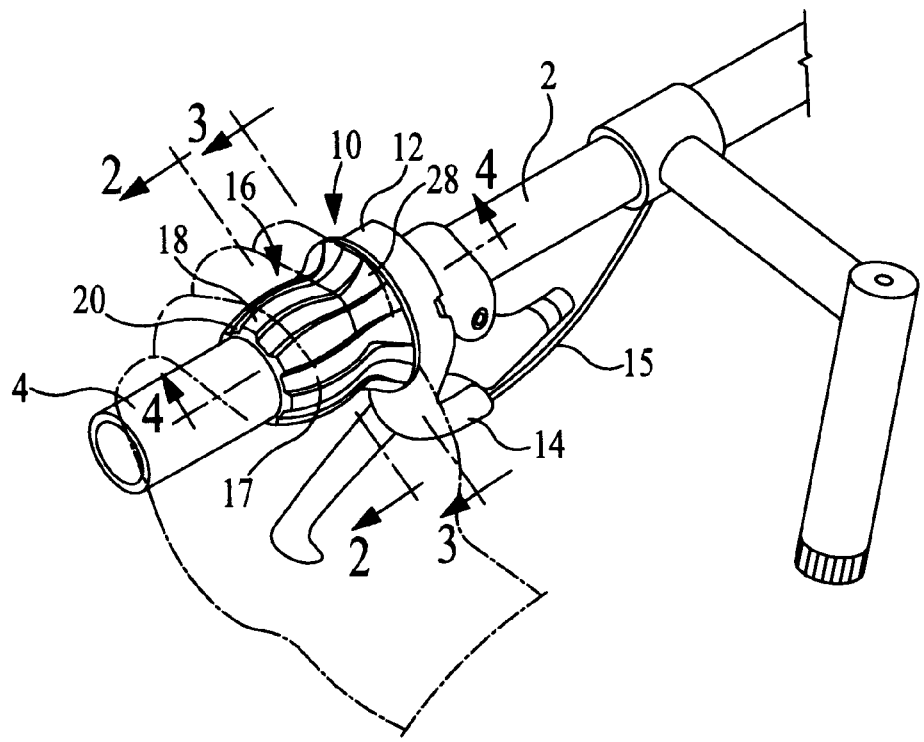
FIG. 1 is an isometric view of a portion of a bicycle handlebar on which is mounted a hand-rotatable gear shifter incorporating a bulbous grip according to the invention.

Referring to FIG. 1, a rotatable bulbous grip for the actuation of a derailleur-type bicycle gear shift system in accordance with one embodiment of this invention will be described. Mounted at the end of a handlebar 2 is a customary stationary handgrip 4. Received coaxially over the handlebar 2 and inboard of the stationary handgrip 4 is a rotatable grip actuating mechanism indicated generally at 10 for a derailleur-type gear shifting system.

The rotatable grip actuating mechanism 10 includes a housing 12 which is fixed to the handlebar 2 and includes a "noodle" portion 14 to which a Bowden cable 15 is connected. A rotatable bulbous grip 16 is provided for actuation of the derailleur-type gear shift system and is disposed between the stationary handgrip 4 and the housing 12. As shown in FIG. 1, a bulbous outer surface 17 of the rotatable grip 16, which is engaged by the rider's hand, is provided with alternating ribs 18 and grooves 20, in accordance with one embodiment of this invention.

A first embodiment of the bulbous gripping surface for a rotatable grip, in accordance with this invention, will be described with reference to FIGS. 1–4. The annular rotatable grip 16, which provides the gripping surface 17, is formed of a somewhat resilient material that is comfortable when clasped by a rider's hand. A preferred material for forming the gripping surface 17 is a thermoplastic elastomer such as KRATON® manufactured by Shell. The material of which rotatable grip 16 is formed is stretched such that it may be positioned coaxially over, and rotatably secured to, a rigid cylindrical member 23 which is rotated to actuate the Bowden cable 15.

Figure 2:
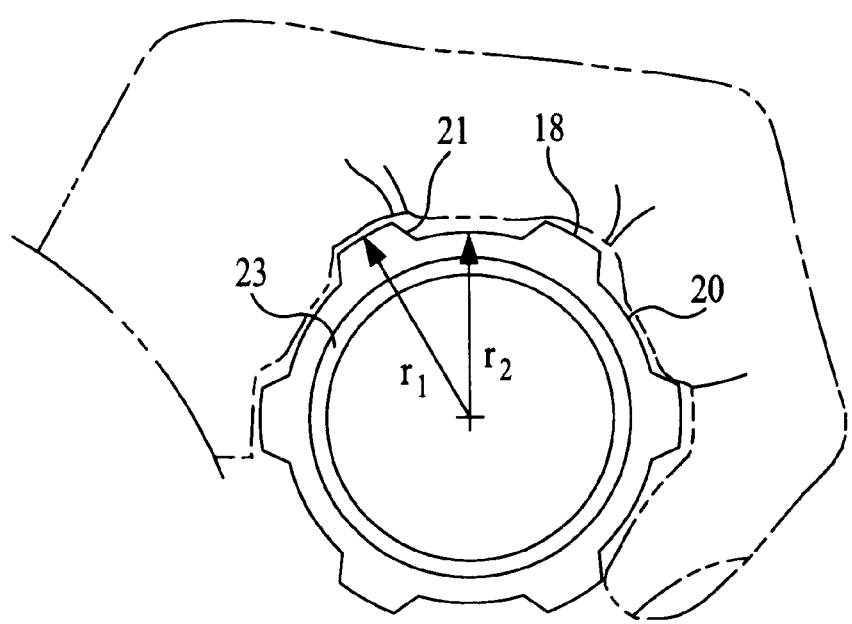
FIG. 2 is a sectional view taken substantially along line 2—2 of FIG. 1.

The ribs 18 and grooves 20 are provided on the bulbous grip outer surface 17 and readily engage the crooks of a rider's finger and thumb and the portion of the palm therebetween. The ribs 18 protrude radially outwardly, at a radius $r_1$, relative to the grooves 20, which have a reduced radius $r_2$, defining sidewalls 21 therebetween. The manner in which the ribs 18 and grooves 20 are received in the crooks of a rider's hand is shown in FIG. 2. With the multiple points of engagement, as shown in FIG. 2, the rider is able to transmit more torque to the rotatable grip 16, more effectively applied over a greater surface area and diameter. Also as seen in FIG. 2, the ribs are sufficiently spaced apart such that a finger can engage both the base surface of groove 20 as well as a sidewall 21 of an adjacent rib 18. Additionally, the ribs are of a sufficient height to protrude above any mud and debris which may collect in the grooves 20.

As installed on a bicycle, a flange portion 28 of resilient grip 16 is disposed adjacent the housing 12, as shown in FIG. 1. The grip 16 of the invention takes advantage of the enlarged diameter of the housing 12 by providing resilient features such as ribs 18 on the flange 28 as well as on the bulbous outer surface 17. The ribs 18 extending onto flange 28 will engage additional surfaces of the thumb and index of the rider's hand thereby allowing the rider to transmit additional torque to the grip 16. The flange portion 28 in general can conform to any of several surfaces of rotation, including a frustaconical surface. The profile of flange 28 should vary smoothly between the inboard end 29 of grip 16 (FIG. 4) and its junction with bulbous portion 17.

Figure 4:
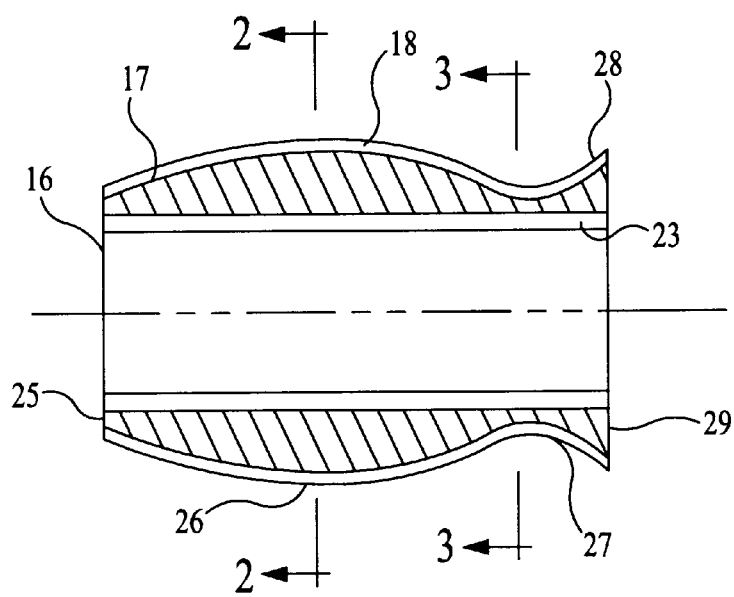
FIG. 4 is an axial sectional view taken substantially along line 4—4 of FIG. 1.

FIG. 4 is an axial sectional view of the resilient grip 16, as mounted on a rotating member 23 which can be of a tough and rigid material. The bulbous profile of the general outer surface 17 (forming grooves 20) can be seen in this section. An outboard end 25 of the general outer surface 17, adapted to receive the relatively short ring finger, has an adjoining small radius relative to the radius of a crown 26 disposed in an inboard direction therefrom, which receives the middle finger of the hand. The bulbous profile then arcuately decreases from the crown 26 to a constriction 27, adapted to receive an index finger and a thumb of the rider's hand. From constriction or minor diameter 27, the flange 28 flares in an axially inboard direction to its major diameter terminating at an inboard end 29 of the grip 16.

Figure 3:
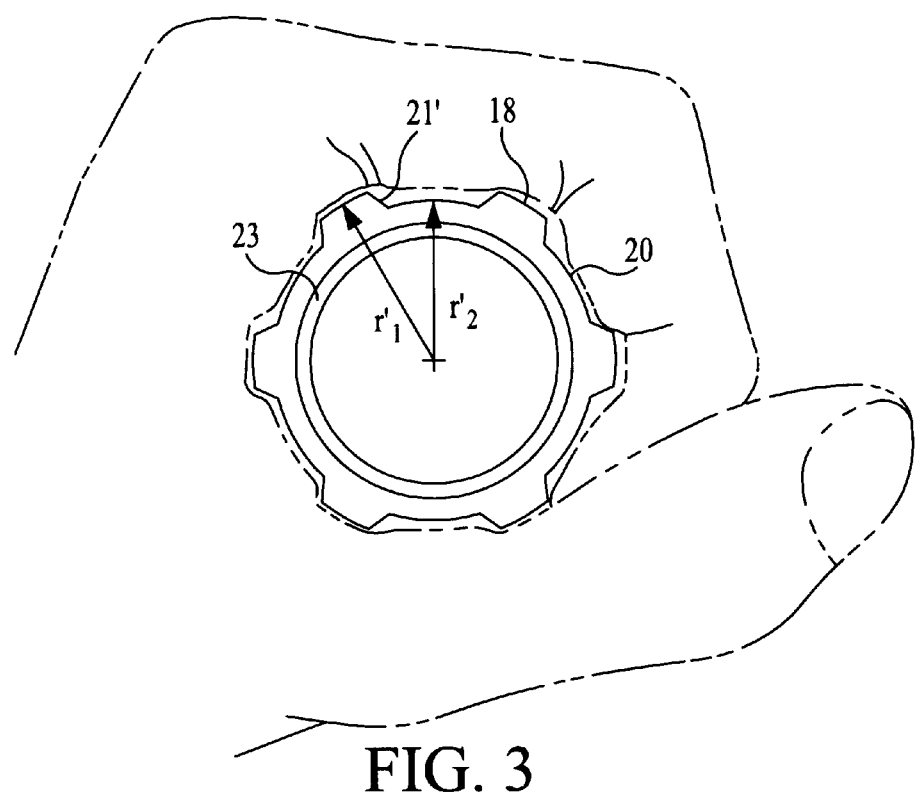
FIG. 3 is a sectional view taken substantially along line 3—3 of FIG. 1.

FIG. 3 is a sectional view taken substantially along line 2—2 of FIG. 1 or constriction 27. As can be seen in FIG. 3, radii $r_1'$ and $r_2'$, defining the outer surfaces of the ribs 18 and grooves 20, respectively, are smaller than corresponding radii $r_1$ and $r_2$ of FIG. 2. Additionally, although the height of sidewalls 21' of FIG. 3 is, likewise, reduced compared to the sidewalls 21 shown in FIG. 2, the reduced diameter grip region 27 still provides crooks-of-hand traction for a rider's index finger, thumb and portion of the palm therebetween.

Preferably, and as can be seen further in FIG. 4, an axial profile of the ribs 18 is also bulbous. The distance between the profile of the general outer surface 17 (or grooves 20) and the profile of the outer surface of the ribs 18 remains substantially constant, so that the crook-engaging features of the ribs 18 continue from finger to finger.

Figure 5:
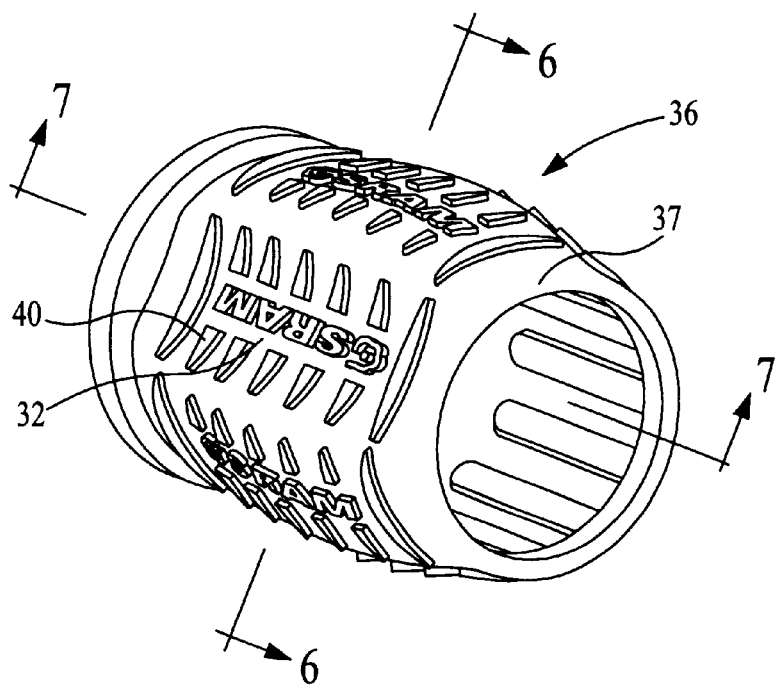
FIG. 5 is an isometric view of a rotatable bulbous grip according to another embodiment of the invention.
Figure 7:
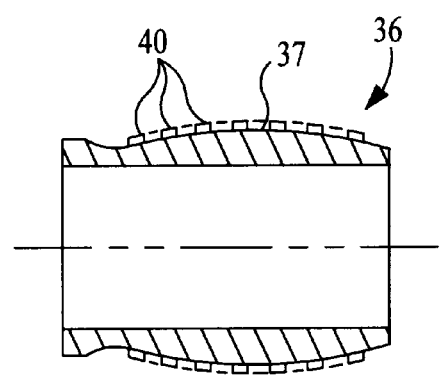
FIG. 7 is an axial sectional view taken substantially along line 7—7 of FIG. 5.
Figure 6:
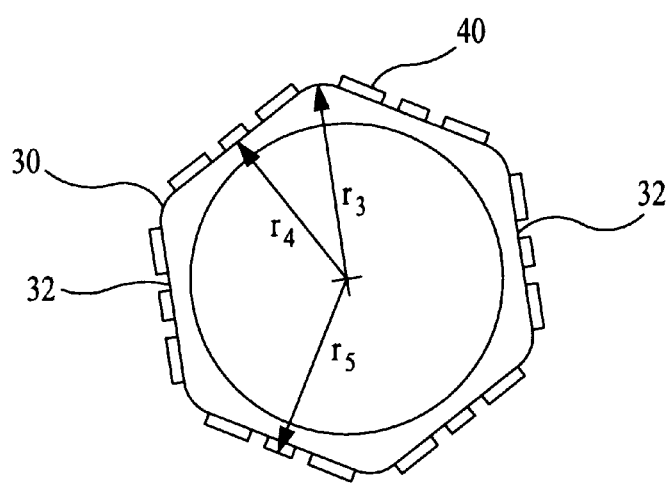
FIG. 6 is a sectional view taken substantially along line 6—6 of FIG. 5.
Figure 8:
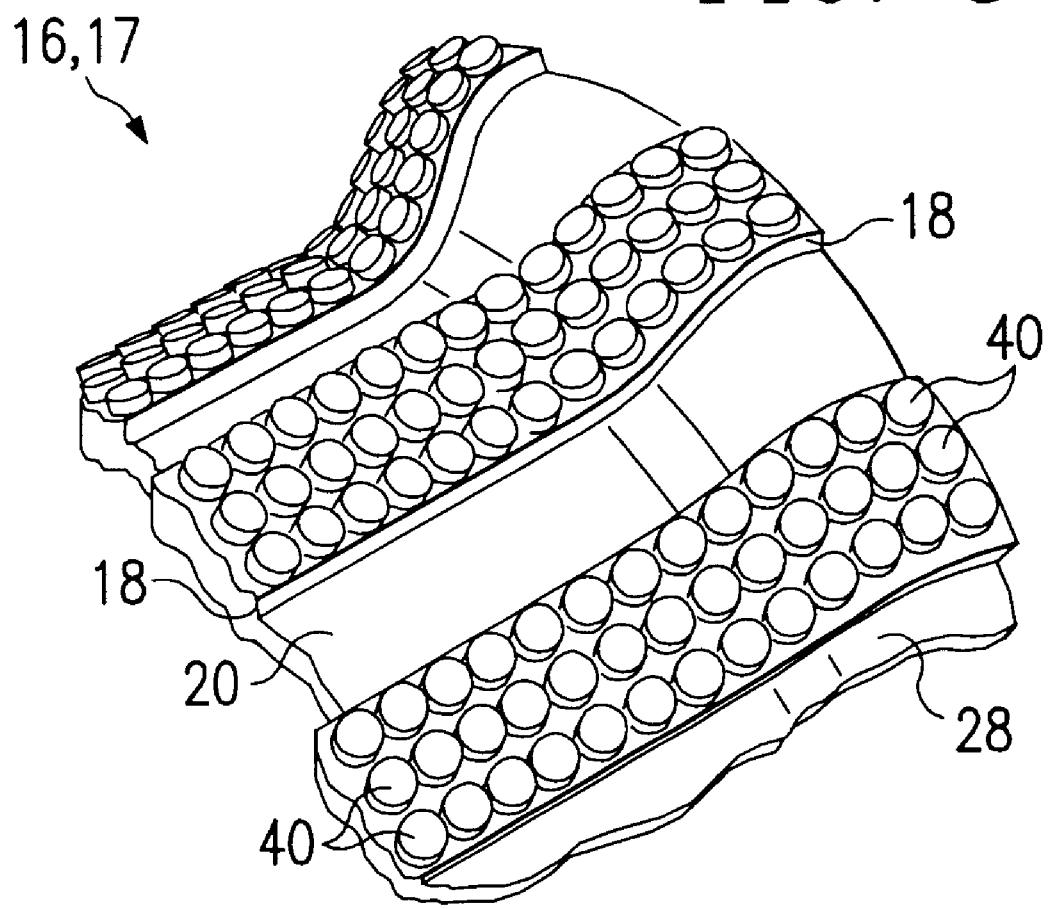
FIG. 8 is an alternate embodiment of the invention, wherein a series of nubs are provided on the outer surface of the ridges and ribs formed on the grip.

In an additional preferred embodiment of this invention, shown in FIGS. 5–7, the angularly alternating ribs 18 and grooves 20 of the grip embodiment depicted in FIG. 1 are replaced with a pattern of ridges 30 and base regions 32 without defined sidewalls. The ridges 30, defined by a radius $r_3$, and the base regions 32, at a radius $r_4$, define the outer surface 37 of grip 36 and, likewise, provide a system of angularly alternating and axially extending features that engage with the crooks of a rider's hand to enhance torque transmission.

In further preferred embodiments of this invention, an array of radially protruding nubs 40 are spaced over the outer surface 37 of grip 36 (nubs shown in base regions 32 in FIGS. 5–6) to further enhance the gripping surface of the rotatable grip. The reduced size of the nubs 40 provides an additional torque transmitting feature that is more deformable than the ribs and ridges previously described. Further, the nubs 40 provide additional cushioning to the rider's hand when subjected to the harsh jarring forces frequently encountered in off-road riding. Finally, by increasing the overall diameter of the rotatable grip, the nubs enable the rider to transmit more torque to the rotatable grips 36. As shown in the preferred embodiment of FIG. 6, a radius $r_5$ defining the outer surface of the nubs 40 is less than the radius $r_3$ defining the ridges 30, thereby allowing the ridges 30 to fit within the crooks of a rider's hand. A system of nubs may also be used on the outer surface of ribs 18 to, likewise, improve torque transmission.

FIG. 7 is an axial sectional view of the resilient grip 36, taken substantially along line 7—7 of FIG. 5. Like the profile shown in FIG. 4, FIG. 7 shows a bulbous profile both of the general outer surface 37 of the grip 36, and a parallel bulbous profile, indicated in dotted line, of the outer surfaces of the plurality of nubs 40 which appear in this axial section.

The right radial distance between the profile of the surface 37 and the profile of the nubs 40 remains substantially constant, therefore, the deformability and cushioning of the nubs 40 remains substantially constant for the fingers and portion of the palm clasping grip 36.

While FIG. 7 is a section taken through two opposed base regions 32, and demonstrates the bulbous profile thereof, an axial section taken through two opposed ridges 30 would likewise yield a bulbous or prolately convex profile. Preferably, the bulbousness of the ridges 30 matches the bulbousness of the base regions 32 so that the crook-engaging features of the grip 36 will be present on all fingers designed to be received by the grip 36.

According to the preferred embodiments of the invention, the prolately bulbous or convex shape of rotatable grips 16 and 36, as taken in a section extending axially along the handlebar axis, provides a larger diameter that naturally conforms to the longer middle finger of a rider's hand relative to the shorter adjoining index and ring fingers. Additionally, a reduced diameter valley region, along line 3—3 of FIG. 4, created between the crown 26 of the bulb, along line 2—2 of FIG. 4, and the flange 28 adjacent the housing 12, naturally cradles and supports the rider's index finger on three sides, thereby further enhancing the torque transmitting characteristics of the shifter. The larger diameter of the bulb relative to the valley region, and the larger diameter of the ribs 18 and ridges 30, enable the rider to shift with greater mechanical advantage, thereby reducing the required shifting force by the rider. Regardless of whether the grip outer surfaces 17 and 37 are characterized by spaced ridges and base regions or ribs and grooves, the bulbous shape along the handlebar axis and the pattern of radially protruding rib or ridge features about the grip circumference provide the rider with a significantly improved ergonomic gripping surface that more naturally conforms to the rider's hand. This in turn allows the rider to exert less gripping force on and impart a greater shifting torque to the shifter 16, thereby reducing hand fatigue.

In summary, novel grips for hand-rotatable bicycle gear shifter have been disclosed and illustrated which provide bulbous surfaces for good retention of torque transmission under adverse environmental conditions, and which optimize the transmission of torque by being ergonomically fitted to a rider's hand. While preferred embodiments and their advantages have been described in the above detailed description, the invention is not limited thereto but only by the scope and spirit of the appended claims.

What is claimed:

1. A hand-rotatable shift actuator adapted to be coaxially mounted over a bicycle handlebar inboard of a stationary handgrip, said shift actuator comprising:

a rotating member adapted to be rotated with respect to the handlebar to actuate a control cable of a bicycle gear shifting system and having an axis and an exterior; and a resilient grip mounted on the exterior of said rotating member and having an outer surface defining a bulbous shape in a direction parallel to the axis, the outer surface having an inboard position and an outboard position adjacent this inboard position, the bulbous grip outer surface is adapted to be engaged by an index finger of a user at the inboard position, the inboard position on said grip having a grip outer surface diameter that is smaller than a grip outer surface diameter at the outboard position on said grip, the outboard position adapted to be engaged by a middle finger of the user, the outboard grip position being closer to an end of the handlebar than the inboard grip position.

2. The shift actuator of claim 1, wherein the grip outer surface further defines:

a plurality of elongated ridges formed substantially in parallel with the axis; and a plurality of elongated base regions angularly spacing apart adjacent ones of said elongated ridges, an outer surface of each of said ridges being radially outwardly displaced from an adjacent base region, an angular extent of said ridges and base regions being preselected such that said grip is adapted to be engaged by a thumb, at least an index finger, and a palm therebetween of a hand of a rider in such a way that the ridges engage only the crooks of the rider's hand formed by the thumb, finger and palm therebetween.

3. The shift actuator of claim 2, wherein said grip has no more than six of said ridges.

4. The shift actuator of claim 2, wherein the grip outer surface is provided with nubs in the elongated base regions, each of said nubs having a radially outward surface area, the surface areas of said nubs adapted to be deflected by engagement by the thumb and one or more fingers and the portion of the palm therebetween of the rider.

5. The shift actuator of claim 2, wherein the outer surface of said ridges is provided with nubs, each of said nubs having a radially outward surface area, the surface areas of said nubs adapted to be deflected by engagement by the thumb and one or more fingers and the portion of the palm therebetween of the rider.

6. The shift actuator of claim 5, wherein the grip outer surface is provided with nubs in the elongated base regions, each of said nubs having a radially outward surface area, the surface areas of said nubs adapted to be deflected by engagement by the thumb and one or more fingers and the portion of the palm therebetween of the rider.

7. The shift actuator of claim 1, further comprising a plurality of elongated ribs formed substantially in parallel with the axis on the grip outer surface, a plurality of grooves angularly spacing apart adjacent ones of said ribs, each of said grooves having a base surface, an outer surface of each of said ribs being radially outwardly displaced from the base surface of an adjacent one of said grooves by a sidewall having a predetermined height, an angular extent of said grooves and said height selected such that said grip is adapted to be engaged by a thumb, at least an index finger, and a palm therebetween of a hand of a rider in such a way that said ribs engage only the crooks of a rider's hand formed by said thumb, finger and palm therebetween.

8. The shift actuator of claim 7, where said grip has no more than six of said ribs.

9. The shift actuator of claim 7, wherein the outer surface of said ribs is provided with nubs, each of said nubs having a radially outward surface area, the surface areas of said nubs adapted to be deflected by engagement by the thumb and one or more fingers and the portion of the palm therebetween of the rider.

10. A hand-rotatable shift actuator adapted to be coaxially mounted over a bicycle handlebar, said shift actuator comprising:

a rotating member adapted to be rotated with respect to the handlebar to actuate a control cable of a bicycle gear shilling system and having an axis and a cylindrical exterior; and a resilient grip mounted on the cylindrical exterior of said rotating member and having an outer surface defining a bulbous shape in a direction parallel to the axis, the grip bulbous outer surface adapted to be engaged by an index finger at an inboard position on said grip and a middle finger at an outboard position on said grip, the outboard position being adjacent to the inboard position, a grip outer surface diameter at the inboard position being smaller than a grip outer surface diameter at the outboard position on said grip so that the inboard position on said grip ergonomically receives the index finger of the user's hand and the outboard position on said grip ergonomically receives the middle finger of the user's hand, the outboard grip position being closer to an end of the handlebar than the inboard grip position, the grip outer surface further defining:

a plurality of elongated ridges formed substantially in parallel with the axis; and a plurality of elongated base regions angularly spacing apart adjacent ones of said elongated ridges, an outer surface of each of said ridges being radially outwardly displaced from an adjacent base region, an angular extent of said ridges and base regions being preselected such that said grip is adapted to be engaged by a thumb, at least an index finger, and a palm therebetween of a hand of a rider in such a way that the ridges engage only the crooks of the rider's hand formed by the thumb, finger and palm therebetween.

11. A resilient grip for a hand-rotatable shift actuator adapted to be coaxially mounted over a bicycle handlebar inboard of a customary handgrip and comprising a rotating member having an axis and an exterior surface generally formed as a surface of rotation, said grip mounted on the exterior surface of said rotating member and having an outer surface defining a bulbous shape in a direction parallel to the axis, the grip bulbous outer surface adapted to be engaged by an index finger at an inboard position on said grip, an outboard position of said grip being adjacent to said inboard position, said inboard position having a grip outer surface diameter that is smaller than a grip outer surface diameter at the outboard position on said grip, the outboard position adapted to be engaged by a middle finger, so that the inboard position on said grip ergonomically receives the index finger of the user's hand and the outboard position on said grip ergonomically receives the middle finger of the user's hand, the outboard grip position being closer to an end of the handlebar than the inboard grip position, the grip outer surface further defining:

a plurality of elongated ridges formed substantially in parallel with the axis;

a plurality of elongated base regions angularly spacing apart adjacent ones of said elongated ridges, an outer surface of each of said ridges being radially outwardly displaced from an adjacent base region, an angular extent of said ridges and base regions being pre selected such that said grip is adapted to be engaged by a thumb, at least an index finger, and a palm therebetween of a hand of a rider in such a way that the ridges engage only the crooks of the rider's hand formed by the thumb, finger and palm therebetween.

12. A hand-rotatable shift actuator adapted to be coaxially mounted over a bicycle handlebar inboard of a stationary handgrip, the shift actuator comprising:

a rotating member adapted to be rotated with respect to the handlebar to actuate a control cable of a bicycle gear shifting system and having an axis and an exterior;

a resilient grip mounted on the exterior of the rotating member;

a general outer surface of the resilient grip having a bulbous profile in a direction parallel to the axis, a profile of the grip taken in a plane including the axis of the grip, a radius in said plane of said grip increasing from an inboard position of the grip to a middle position of the grip so that the inboard position on said grip ergonomically receives the index finger of the user's hand and the middle position on said grip ergonomically receives the middle finger of the user's hand; and a plurality of nubs formed on the general outer surface and extending radially outwardly therefrom, a profile of the plurality of the nubs in a direction parallel to the axis being bulbous.

13. The shift actuator of claim 12, wherein the profile of the plurality of nubs is at a substantially constant distance from the profile of the general outer surface, as taken in the same plane.

14. The shift actuator of claim 12, further comprising a flange of the grip formed inwardly of the bulbous profile of the general outer surface of the resilient grip, a major diameter of the flange disposed at an inner axial end of the resilient grip, a minor diameter of the flange formed outwardly on the grip from the inner axial end and adjoining the bulbous profile of the general outer surface of the grip, the bulbous profile and the flange adaptable to contact a thumb and index finger of a hand of the rider on three sides of the thumb and the index finger in order to enhance torque transmission.

* * * * *